H. J. ZIMMERMANN.
LIQUID AND GAS CONTACT APPARATUS.
APPLICATION FILED JULY 5, 1918.

1,350,202.

Patented Aug. 17, 1920.

Inventor:
Hans Joseph Zimmermann,

UNITED STATES PATENT OFFICE.

HANS J. ZIMMERMANN, OF CHICAGO, ILLINOIS, ASSIGNOR, BY MESNE ASSIGNMENTS, TO THE G. A. BUHL COMPANY, OF CHICAGO, ILLINOIS, A CORPORATION OF ILLINOIS.

LIQUID AND GAS CONTACT APPARATUS.

1,350,202.   Specification of Letters Patent.   Patented Aug. 17, 1920.

Application filed July 5, 1918. Serial No. 243,326.

*To all whom it may concern:*

Be it known that I, HANS JOSEPH ZIMMERMANN, a subject of the Emperor of Germany, residing at Chicago, in the county of Cook and State of Illinois, have invented a new and useful Improvement in Liquid and Gas Contact Apparatus, of which the following is a specification.

This invention relates to improvements in apparatus for securing contact between a liquid and a gas, more particularly between a sprayed liquid and a moving stream of gas (or vapor).

As illustrated examples of the particular arts in which my invention is useful, the following may be given:

1. The humidifying of air.
2. The absorption of water vapor by sulfuric acid.
3. The evaporation of the aqueous content of an atomized solution by dry air or other gas, or superheated steam.
4. The concentration or fractionation of a sprayed liquid by evaporation from the surfaces of the droplets.

In all of the foregoing particular arts the efficiency of the liquid and gas contact apparatus may be said to depend upon the energy required for producing the liquid spray and the gas flow, and the degree of saturation reached at the end of the process. By my invention, intermixing of the sprayed liquid and of the flowing gas current is achieved in the simplest manner and with a minimum expenditure of energy.

An apparatus in accordance with my invention is illustrated diagrammatically in the accompanying drawings, in which—

Figure 1:
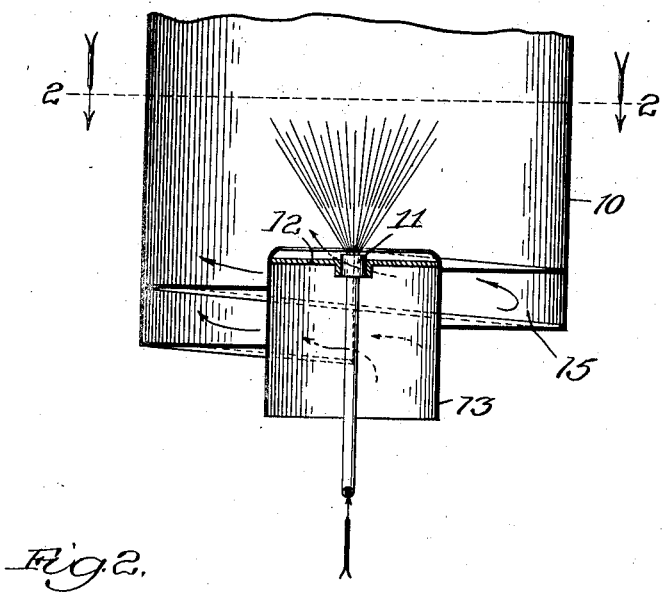
Figure 2:
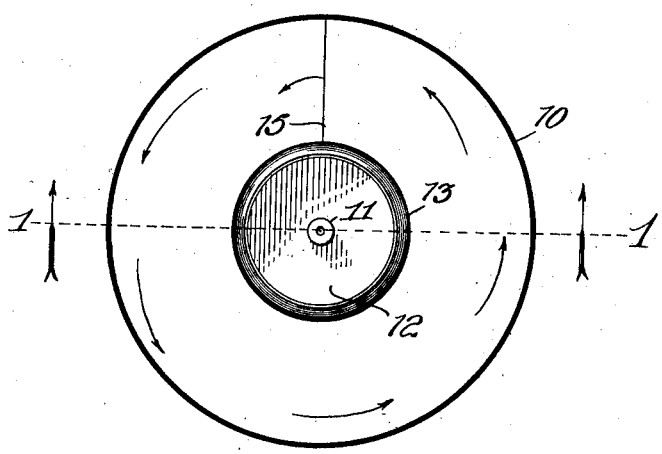

Figure 1 is a longitudinal central section through the lower portion of a cylindrical drum in which the mixing takes place, and Fig. 2 is a transverse section on the line 2 of Fig. 1.

Referring more particularly to the drawings, the numeral 10 designates the cylindrical wall of the casing or drum, which constitutes the mixing or evaporating chamber. The spray nozzle by which the liquid is introduced is designated 11, and lies on the axis of the drum. Immediately surrounding the spray nozzle there is an imperforate disk 12 of considerable diameter, which forms the head for a cylindrical core 13 arranged coaxially of the drum. The gas is admitted to the drum 10 through the annular space between the core 13 and the wall of the drum, and in accordance with the present invention the incoming gas current is deflected by a helicoidal vane 15 of the full width of the annular opening. The air current therefore enters the drum 10 tangentially thereof, and in its progress along the length of the drum will pursue a helical course.

By reason of the disk 12 and core 13 the liquid spray, which will normally be of conical form, is protected from the gas current until it has expanded to a diameter approximating the diameter of the disk 12. This is of advantage for the reason that the density of the spray decreases in proportion to the square of the distance from the nozzle. The gas current therefore meets the spray only after the latter has been so far thinned out or developed that the gas current may readily pass between the individual droplets, and without interfering with the course of the latter, in such a way as to cause them to collide and coalesce into drops of greater size, than would be the case were the gas current permitted to traverse the course of the spray before the latter had become thinned out. This desirable result, achieved by the use of the spray shield, made up of the core 13 and disk 12, is not dependent upon the use of a helical gas current, but is of advantage likewise with the ordinary form of gas and liquid mixing apparatus in which the liquid is sprayed directly along the axis of flow of the gas.

The helical gas current produced by the vane 15 is of particular advantage, however, in that it brings into play the action of centrifugal force for causing the liquid droplets to traverse the whole of the gas-body. Thus it will be seen, by reference to Fig. 1, that the atomized or sprayed liquid protected by the disk 12 until it has fully developed, is seized upon by the inner portion of a revolving helical gas current passing upwardly within the drum 10. In this upward helical motion of the gas current each liquid droplet will be acted upon by centrifugal force, and will thus be caused to move radially outward through the air as it moves upwardly along the length of the drum. These conditions make for the utmost efficiency of intermixture between the liquid and the gas. While it is ordinarily necessary to use a considerable excess of air for the complete evaporation of water, for example, I find that by the use of the construction illustrated in Fig. 1 it is possible to completely evaporate a water spray and secure substantially complete saturation of the air current, and this without resorting to high atomizing pressures, but merely by the use of a reasonable pressure with any efficient form of atomizing nozzle.

For the purpose of bringing out more clearly the essential elements of the invention, I have shown and described the disk 12 as being entirely imperforate, so that no gas at all may pass therethrough. It will be understood, however, that the benefits of the invention may be substantially attained even though the shield or disk 12 be permeable to gas to a reasonable extent. In some cases there may be a slight advantage in such permeability of the disk 12, as, for example, when it is found that the movement of the gas current is of such velocity as to tend to create undesirable gas-flow conditions in the space surrounding the nozzle.

While I have in the foregoing described in considerable detail one apparatus operating according to my invention, it will be understood that this is illustrative only and for the purpose of making the invention more clear, and that the invention is not limited to the details set forth, except insofar as they may be included within the terms of the accompanying claims, in which it is my intention to claim all novelty inherent in my invention as broadly as is permissible, in view of the prior art.

What I claim is:

1. The method of securing a homogeneous mixture between an atomized liquid and a gas current, which consists in spraying the liquid in a substantially axial line into a helically-moving gas current, and shielding the central portion of the spray from the direct action of the said current, in order that the spray may be permitted to become reduced in density before it becomes affected by the moving current of gas.

2. The combination with a gas conduit, of a spray nozzle mounted substantially axially with respect to the conduit, a shield of substantial diameter behind and concentric with the nozzle and means for causing the gas within the conduit to assume a helical motion at the zone of the spray.

3. In combination with a gas conduit, a spray nozzle mounted to deliver in a line substantially axially of the conduit, a shield of substantial diameter mounted concentrically with and behind the spray nozzle, and an annular, helicoidal vane lying between the conduit wall and the said shield for directing the gas current in a helicoidal line at the zone of the spray.

HANS J. ZIMMERMANN.